United States Patent
Chang et al.

(10) Patent No.: US 9,442,242 B2
(45) Date of Patent: Sep. 13, 2016

(54) BACKLIGHT MODULE AND LIQUID CRYSTAL DISPLAY

(71) Applicant: Radiant Opto-Electronics Corporation, Kaohsiung (TW)

(72) Inventors: Chia-Yin Chang, Kaohsiung (TW); Chih-Chiang Chang, Kaohsiung (TW); Shan-Fu Chang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 20 days.

(21) Appl. No.: 14/160,530

(22) Filed: Jan. 21, 2014

(65) Prior Publication Data

US 2015/0070627 A1    Mar. 12, 2015

(30) Foreign Application Priority Data

Sep. 10, 2013    (TW) .............................. 102132612 A

(51) Int. Cl.
    *G02F 1/1335* (2006.01)
    *F21V 8/00* (2006.01)
    *G02B 5/04* (2006.01)

(52) U.S. Cl.
    CPC ............. *G02B 6/0053* (2013.01); *G02B 5/045* (2013.01)

(58) Field of Classification Search
    CPC .......................... G02B 6/0053; G02F 1/1335
    USPC ........................................................ 349/65
    See application file for complete search history.

(56) References Cited

U.S. PATENT DOCUMENTS

| | | | | |
|---|---|---|---|---|
| 6,104,454 | A | * | 8/2000 | Hiyama et al. ................. 349/65 |
| 6,196,691 | B1 | * | 3/2001 | Ochiai ................. G02B 6/0038 349/62 |
| 6,425,673 | B1 | * | 7/2002 | Suga et al. ..................... 362/613 |
| 6,454,452 | B1 | * | 9/2002 | Sasagawa et al. ............ 362/561 |
| 2002/0036729 | A1 | * | 3/2002 | Ohkawa ............... G02B 6/0036 349/65 |
| 2006/0164864 | A1 | | 7/2006 | Arihara |
| 2010/0128495 | A1 | * | 5/2010 | Wang et al. .................. 362/620 |
| 2013/0194823 | A1 | | 8/2013 | Yagi et al. |

FOREIGN PATENT DOCUMENTS

| | | |
|---|---|---|
| CN | 201007769 Y | 1/2008 |
| CN | 101364007 A | 2/2009 |

(Continued)

OTHER PUBLICATIONS

Machine translation of JP 2007-329007.*

*Primary Examiner* — Lucy Chien
(74) *Attorney, Agent, or Firm* — CKC & Partners Co., Ltd.

(57) ABSTRACT

A backlight module and a liquid crystal display are described. The backlight module includes a light guide plate, a light source and a prism sheet. The light guide plate includes a light-emitting surface, a light-incident surface and an axis. The light-incident surface is connected to the light-emitting surface. The axis is normal to the light-incident surface. The light source emits light towards the light-incident surface. The prism sheet is disposed on the light guide plate and includes a first optical surface and a plurality of prism structures which are disposed on the first optical surface. Each of the prism structures has a first surface and a second surface. The first surface and the second surface are connected to form a ridge. The ridge is vertical to the light-incident surface, or an angle included between the ridge and the axis is smaller than or equal to 20 degrees.

17 Claims, 6 Drawing Sheets

(56) References Cited

FOREIGN PATENT DOCUMENTS

| CN | 101694285 A | 4/2010 |
|---|---|---|
| CN | 202056753 U | 11/2011 |
| CN | 202229028 U | 5/2012 |
| CN | 102620212 A | 8/2012 |
| JP | H08262206 A | 10/1996 |
| JP | 2005044642 A | 2/2005 |
| JP | 2006099975 A | 4/2006 |
| JP | 4052863 B2 | 2/2008 |
| JP | 2010164916 A | 7/2010 |
| TW | 200422721 A | 11/2004 |
| TW | 200912474 A | 3/2009 |

* cited by examiner

BACKLIGHT MODULE AND LIQUID CRYSTAL DISPLAY

RELATED APPLICATIONS

This application claims priority to Taiwan Application Serial Number 102132612 filed Sep. 10, 2013, which is herein incorporated by reference.

BACKGROUND

1. Field of Invention

The present invention relates to a backlight module. More particularly, the present invention relates to a backlight module and a liquid crystal display used, for a non-orthogonal view display.

2. Description of Related Art

With the rapid development of portable electronic products such as smart phones and tablet computers, because a user does not need to use a desktop computer to browse the Internet and acquire information, the user's lifestyle is changed greatly. For example, the user may use a smart phone or a tablet computer handily for internet-browsing, communication, entertainment and data-processing while moving outdoors, commuting or at leisure times.

When using such types of portable electronic products, the user often likes to share screen images with a neighboring person and watch the same screen together. Thus, conventional orthogonal view displays designed in accordance with users viewing habits cannot meet new use requirements.

Hence, there is need to develop a backlight module and a liquid crystal display to overcome the foregoing problems.

SUMMARY

One aspect of the present invention is to provide a backlight module and a liquid crystal display, in which a prism sheet with prism structures is used to change light-emitting angles of light passing through a light guide plate, and each of the prism structures has a ridge vertical to a light-emitting surface of a light source, so as to achieve a purpose of emitting light at non-orthogonal view angles. In addition, the light emitting intensity may be adjusted by altering a first angle and a second angle included between the prism structures and an optical surface, thereby meeting use requirements of various products. Moreover, the orientations of the prism structures can be varied to form an angle included between the ridge and the light-emitting surface of the light source and the angle to be smaller than or equal to 20 degrees, thereby adjusting the ratio of view angles with which the light is emitted, thus generating different directions of view angles.

According to the aforementioned objects, a backlight module is provided and includes a light guide plate, a light source and a prism sheet. The light guide plate includes a light-emitting surface, a light-incident surface and an axis. The light-incident surface is connected to the light-emitting surface. The axis is normal to the light-incident surface. The light source emits light towards the light-incident surface. The prism sheet is disposed on the light guide plate. The prism sheet includes a first optical surface and a plurality of prism structures. The first optical surface faces the light-emitting surface. The prism structures are disposed on the first optical surface, in which each of the prism structures has a first surface and a second surface, and the first surface and the second surface are connected to form a ridge, in which the ridge is vertical to the light-incident surface of the light guide plate, or an angle included between the ridge and the axis is smaller than or equal to 20 degrees.

According to an embodiment of the present invention, a first angle is included between the first optical surface and the first surface of each of the prism structures, and a second angle is included between the first optical surface and the second surface of each of the prism structures, in which the first angle and the second angle are equal.

According to an embodiment of the present invention, the first angle and the second angle of each of the prism structures are 45 degrees.

According to an embodiment of the present invention, a first angle is included between the first optical surface and the first surface of each of the prism structures, and a second angle is included between the first optical surface and the second surface of each of the prism structures, in which the first angle and the second angle are unequal.

According to an embodiment of the present invention, the first angle of each of the prism structures is 45 degrees, and the second angle of each of the prism structures is in a range from 40 degrees to 45 degrees.

According to an embodiment of the present invention, the prism sheet further includes a second optical surface opposite to the first optical surface, and a plurality of microstructures are disposed on the second optical surface.

According to an embodiment of the present invention, the microstructures disposed on the second optical surface of the prism sheet are prism structures, V-shaped structures, arc shape structures or dotted structures.

According to an embodiment of the present invention, a plurality of microstructures are disposed on the light-emitting surface.

According to an embodiment of the present invention, the microstructures disposed on the light-emitting surface of the light guide plate are prism structures, V-shaped structures, arc shape structures or dotted structures.

According to an embodiment of the present invention, the backlight module further includes two optical films respectively disposed on the prism sheet and between the light guide plate and the prism sheet.

According to the aforementioned objects, a liquid crystal display is provided and includes a backlight module and a liquid crystal panel. The backlight module includes a light guide plate, a light source and a prism sheet. The light guide plate includes a light-emitting surface, a light-incident surface and an axis. The light-incident surface is connected to the light-emitting surface. The axis is normal to the light-incident surface. The light source emits light towards the light-incident surface. The prism sheet is disposed on the light guide plate. The prism sheet includes a first optical surface and a plurality of prism structures. The first optical surface faces the light-emitting surface. The prism structures are disposed on the first optical surface, in which each of the prism structures has a first surface and a second surface, and the first surface and the second surface are connected to form a ridge, in which the ridge is vertical to the light-incident surface of the light guide plate, or an angle included between the ridge and the axis is smaller than or equal to 20 degrees. The liquid crystal panel disposed on the backlight module.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
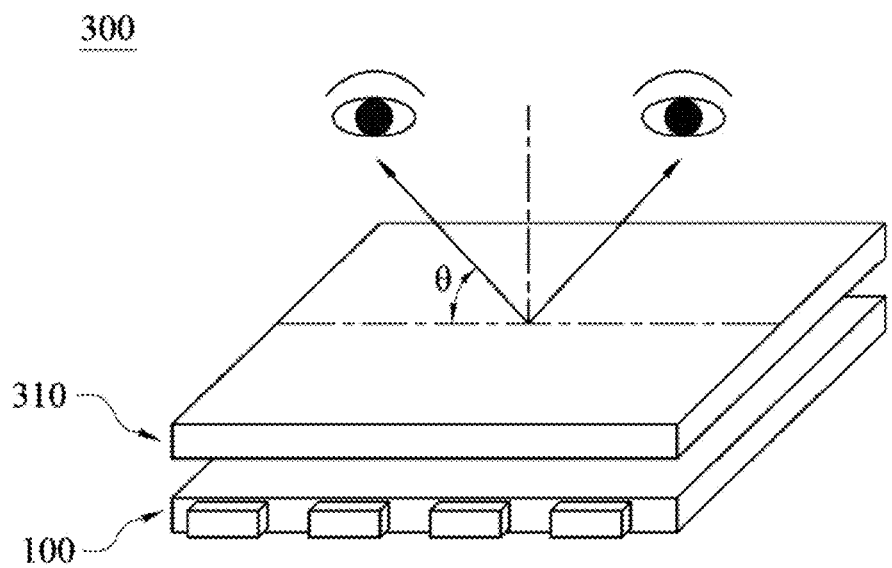
FIG. 1 is a schematic diagram showing a display manner of a liquid crystal display in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
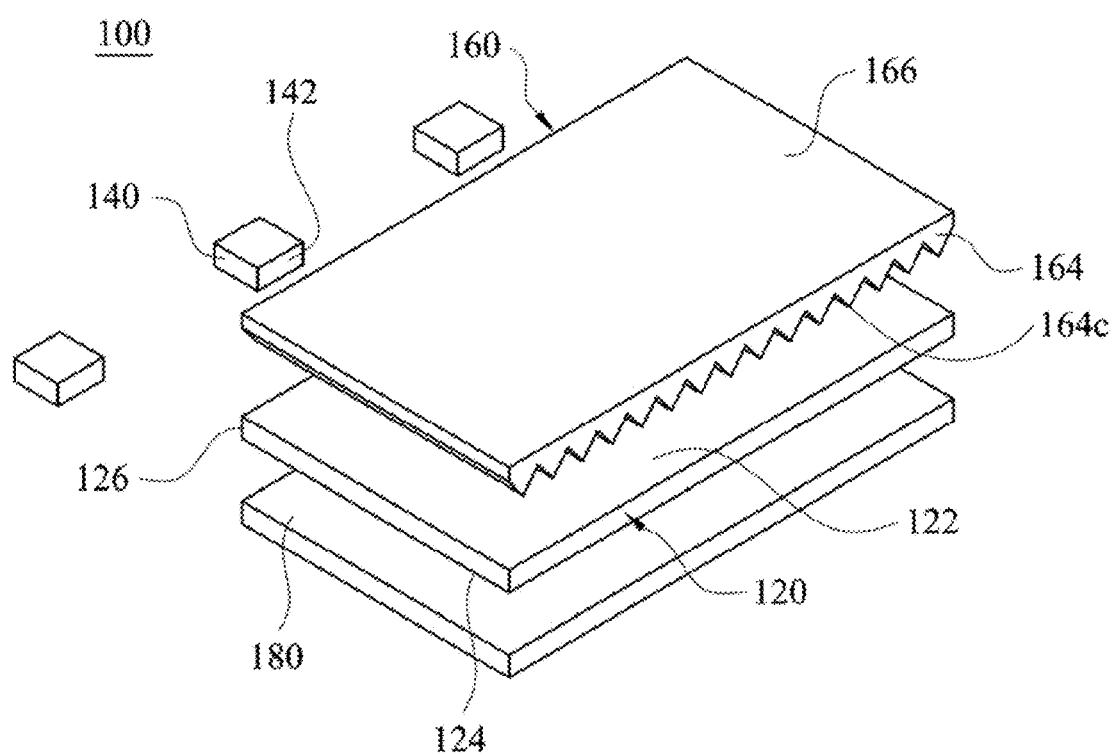
FIG. 2 is a schematic structural diagram showing a backlight module in accordance with an embodiment of the present invention.

Referring to FIG. 1 and FIG. 2, FIG. 1 is a schematic diagram showing a display manner of a liquid crystal display 300 in accordance with an embodiment of the present invention, and FIG. 2 is a schematic structural diagram showing a backlight module 100 in accordance with an embodiment of the present invention. In the present embodiment, the liquid crystal display 300 mainly includes the backlight module 100 and a liquid crystal panel 310. The liquid crystal panel 310 is disposed on the backlight module 100, i.e., the backlight module 100 is disposed behind the liquid crystal panel 310 to provide back lighting to the liquid crystal panel 310. In one embodiment, a view angle θ of the liquid crystal display 300 is in a range from about 40 degrees to about 60 degrees. The backlight module 100 mainly includes a light guide plate 120, a light source 140 and a prism sheet 160. The prism sheet 160 is disposed on the light guide plate 120. Light generated from the light source 140 passes through the prism sheet 160 after entering the light guide plate 120, so as to be emitted at a non-orthogonal view angle. The "non-orthogonal view angle" described above is referred to as a view angle formed by the light emitted from a direction not vertical to the prism sheet 160.

As shown in FIG. 2, the light guide plate 120 mainly includes a light-emitting surface 122, a reflecting surface 124 and a light-incident surface 126. The light-emitting surface 122 and the reflecting surface 124 are respectively located on two opposite sides of the light guide plate 120. The light-incident surface 126 connects the light-emitting surface 122 and the reflecting surface 124. The light source 140 is disposed by the light guide plate 120 and emits light towards the light-incident surface 126. In other words, the light source 140 has a light-emitting surface 142 facing the light-incident surface 126 of the light guide plate 120. Therefore, after entering the light guide plate 120 the light emitted from the light-emitting surface 142 of the light source 140 is emitted from the light-emitting surface 122 of the light guide plate 120. In one embodiment a reflecting sheet 180 may be disposed under the ht guide plate 120 to reflect light emitted from the reflecting surface 124 back to the light guide plate 120, thereby increasing usage efficiency of the light.

Figure 3:
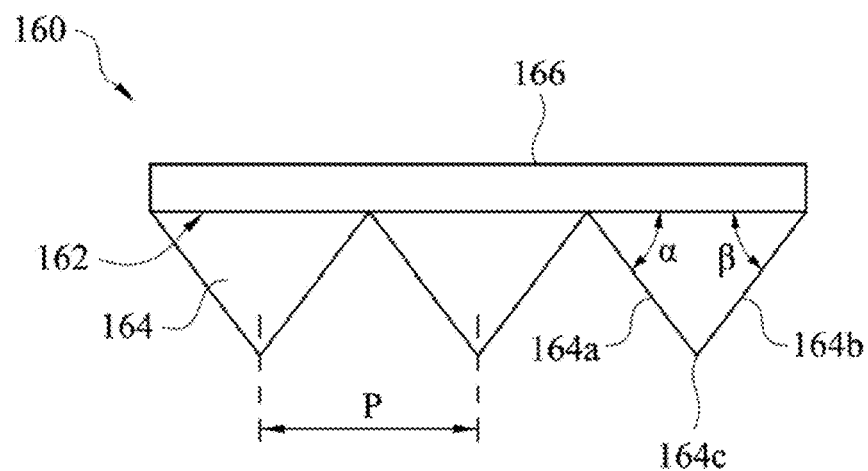
FIG. 3 is a schematic cross-sectional view of a prism sheet in accordance with an embodiment of the present invention.

Referring to FIG. 2 and FIG. 3 simultaneously FIG. 3 is a schematic cross-sectional view of a prism sheet in accordance with an embodiment of the present invention. The prism sheet 160 is disposed on light-emitting surface 122 of the light guide plate 120. The prism sheet 160 is mainly used to change a direction of the light emitted from the light-emitting surface 122. The prism sheet 160 includes an optical surface 162 and a plurality of prism structures 164. The prism structures 164 are disposed on the optical surface 162, and the optical surface 162 faces the light-emitting surface 122 of the light guide plate 120. In other words, the prism structures 164 protrude from the optical surface 162 towards the light-emitting surface 122 of the light guide plate 120. As shown in FIG. 3, each of the prism structures 164 has a first surface 164a and a second surface 164b. The first surface 164a and the second surface 164b are connected to form a ridge 164c. In the present embodiment, the ridge 164c of each of the prism structures 164 is vertical to the light-incident surface 126 of the light guide plate 120.

In one embodiment, a first angle α is included between the first surface 164a and the optical surface 162, and a second angle β is included between the second surface 164b and the optical surface 162. In one embodiment, the first angle α and the second angle β are designed according to the requirements of different view angles, thereby changing light-emitting angles of the light emitted from the prism sheet 160 and forming two different light fields with non-orthogonal view angles. Meanwhile, the shape of each of the prism structures 164 may be different by changing the first angle α and the second angle β.

Figure 4:
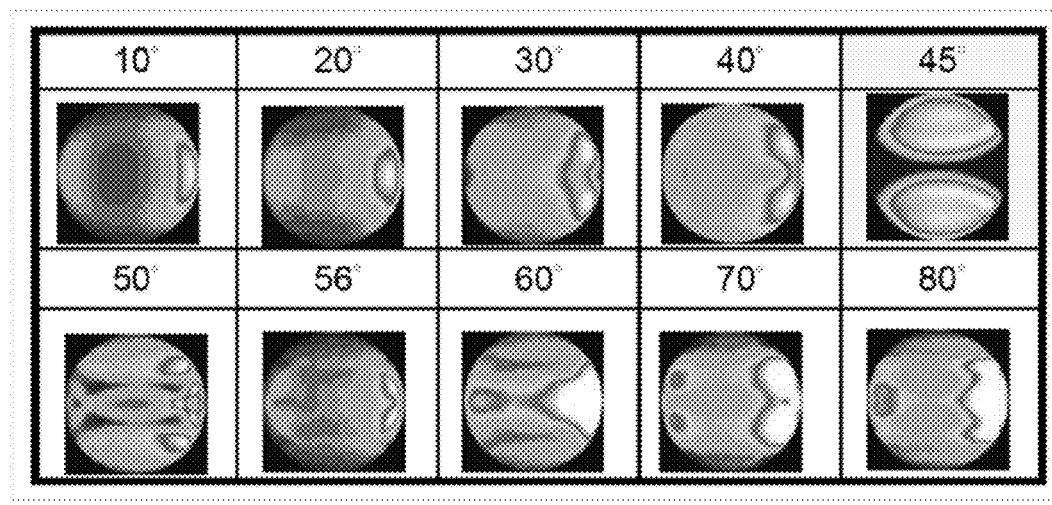
FIG. 4 shows simulated view angle diagrams by changing first and second angles of a prism sheet which are of the same value and included between two respective surfaces of the prism sheet and an optical surface in accordance with an embodiment of the present invention.

Referring to FIG. 3 and FIG. 4 simultaneously, FIG. 4 is shows simulated view angle diagrams by changing first and second angles of a prism sheet which are of the same value and included between two respective surfaces of the prism sheet and an optical surface in accordance with an embodiment of the present invention. In the present embodiment, the first angle α formed between the first surface 164a and the optical surface 162 and the second angle β formed between the second surface 164b and the optical surface 162 are the same. FIG. 4 shows variations of view angles when the first angle α and the second angle β are at 10 degrees, 20 degrees, 30 degrees, 40 degrees, 45 degrees, 50 degrees, 56 degrees, 60 degrees, 70 degrees, and 80 degrees respective. In the present embodiment, a distance P between two adjacent prism structures 164 is 24 μm, i.e., a distance between two adjacent ridges 1640 is 24 μm. As shown in FIG. 4, when the first angle α and the second angle β are at 45 degrees, view angles and brightness generated in two different directions of light emitted from prism sheet 160 are about the same, and the view angles are in a range from about 40 degrees to about 60 degrees.

Figure 5:
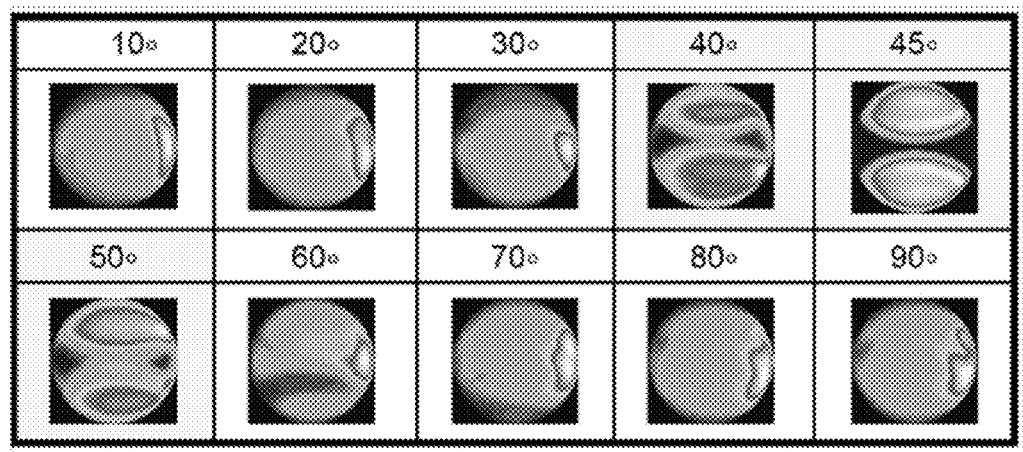
FIG. 5 shows simulated view angle diagrams by changing first and second angles of a prism sheet which are of different values included between two respective surfaces of the prism sheet and an optical surface in accordance with an embodiment of the present invention.

Referring to FIG. 3 and FIG. 5 simultaneously, FIG. 5 shows simulated view diagrams by changing first and second angles of a prism sheet which are of different values included between two respective surfaces of the prism sheet and an optical surface in accordance with an embodiment of the present invention. In the present embodiment, the first angle α formed between the first surface 164a and the optical surface 162 and the second angle β formed between the second surface 164b and the optical surface 162 are different. FIG. 5 shows variations of view angles when the first angle α is at 45 degrees and the second angle β is at 10 degrees, 20 degrees, 30 degrees, 40 degrees 45 degrees, 50 degrees, 60 degrees, 70 degrees, 80 degrees and 90 degrees respectively. In the present embodiment, a distance P between two adjacent prism structures 164 is 24 μm. It can be known from FIG. 5 that, when the first angle α is at 45 degrees and the second angle β is 40 degrees, 45 degrees and 50 degrees, view angles of two different directions of light are generated. Further, when the second angle β is at 45 degrees and 50 degrees, FIG. 5 shows two view angles with different values and brightness, meaning that the light intensities at two view angles can be adjusted by changing the first angle α and the second angle β.

Referring to FIG. 3 again, in one embodiment, the prism sheet 160 further includes an optical surface 166. The optical surface 166 and the optical surface 162 are located the two opposite sides of the prism sheet 160. A plurality of microstructures, such as V-shaped structures, arc shape structures, dotted structures or prism structures, may be disposed on the optical surface 166, so as to adjust the light intensity at the light-emitting view angle.

Figure 6:
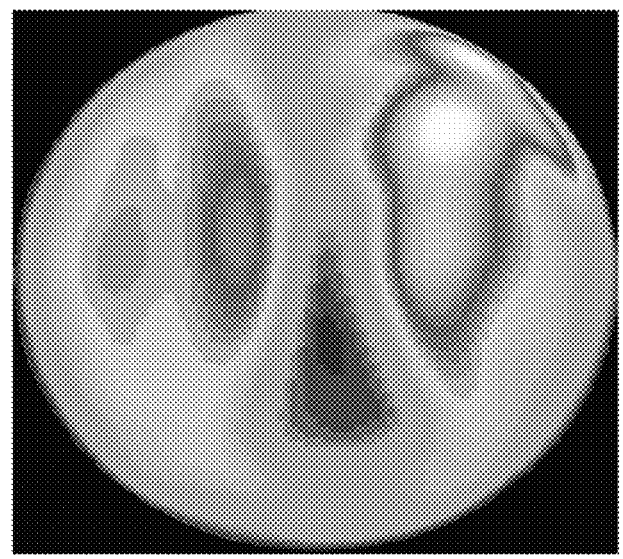
FIG. 6 shows a simulated view angle diagram from a backlight module in accordance with another embodiment of the present invention.

Referring to FIG. 6, FIG. 6 shows a simulated view angle diagram from a backlight module in accordance with another embodiment of the present invention. In the present embodiment, the prism sheet 160 with prism structures 164 disposed on the optical surface 162 and other prism structures disposed on the optical surface 166 is used for simulation. The ridge 164c of the prism structures 164 disposed on the optical surface 162 is vertical to the light-incident surface 126 of the light guide plate 120, and the first angle α and the second angle β are at 45 degrees. Meanwhile, each of the prism structures disposed on the optical surface 166 has two surfaces, and the two surfaces are connected to form a ridge. Two angles included between the two surfaces and the optical surface 166 are respectively at 85 degrees and 10 degrees, and an angle included between the ridge and the light-incident surface 126 of the light guide plate 120 is at 55 degrees. As shown in FIG. 6, different view angles in two different directions can be formed and the light intensities at two view angles can be adjusted by disposing prism structures on both sides of the prism sheet 160.

Figure 7:
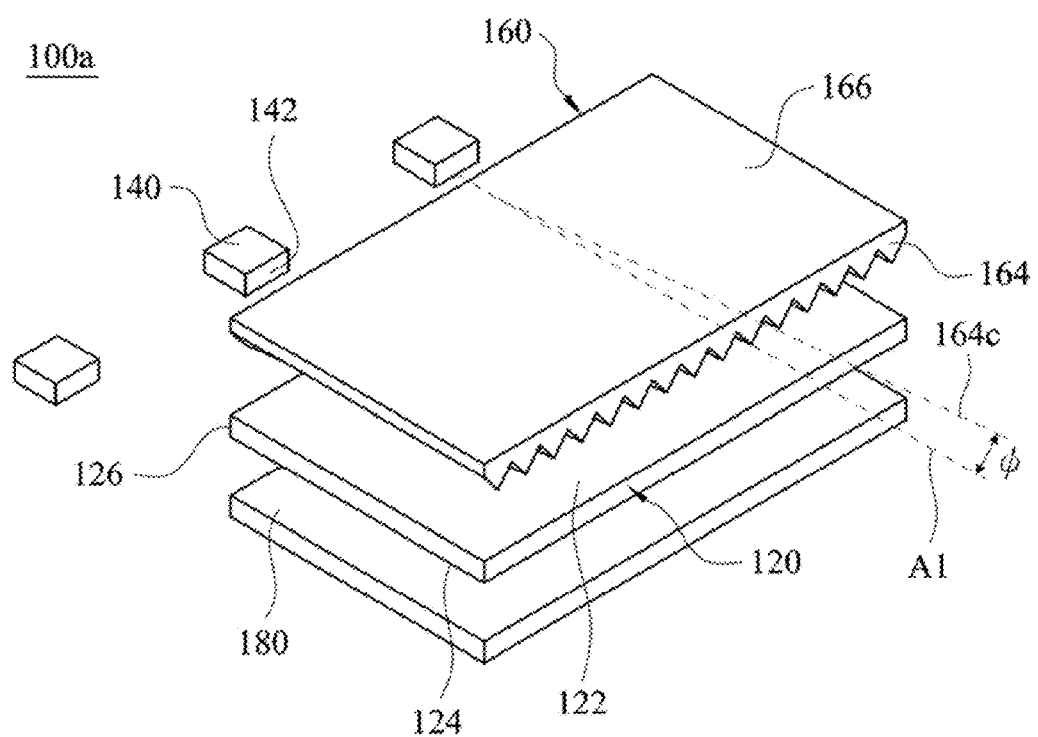
FIG. 7 is a schematic structural diagram of a backlight module in accordance with another embodiment of the present invention.
Figure 8:
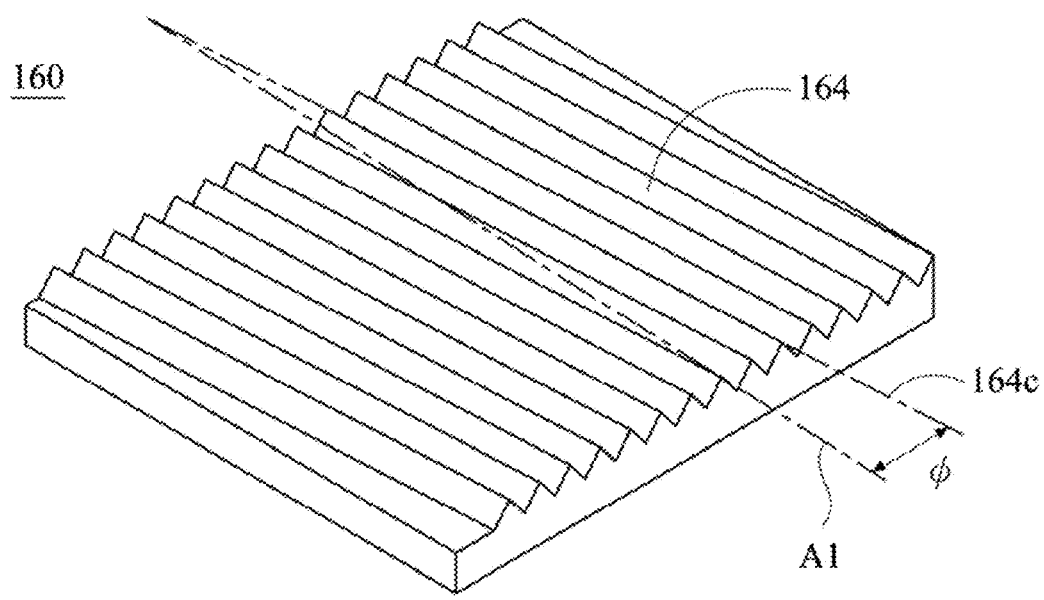
FIG. 8 is a schematic structural diagram of a prism sheet in accordance with another embodiment of the present invention.

It is noted that the ridge 164c of the prism structures 164 in FIG. 2 and FIG. 3 is vertical to the light-incident surface 126 of the light guide plate 120. In some embodiments, an angle may be formed between the ridge 164c and the light guide plate 120. Referring to FIG. 7 and FIG. 8, FIG. 7 is a schematic structural diagram of a backlight module 100a in accordance with another embodiment of the present invention, and FIG. 8 is a schematic structural diagram of a prism sheet in accordance with another embodiment of the present invention. It is noted that an axis A1 shown in FIG. 7 and FIG. 8 can be referred to any axes normal to the light-incident surface 126 of the light guide plate 120. The backlight module 100a in the present embodiment is similar to the backlight module 100 in FIG. 2, besides an angle φ is included between the ridge 164c of the prism structures 164 and the axis A1. In one embodiment, the angle φ may be smaller than or equal to 20 degrees.

Figure 9:
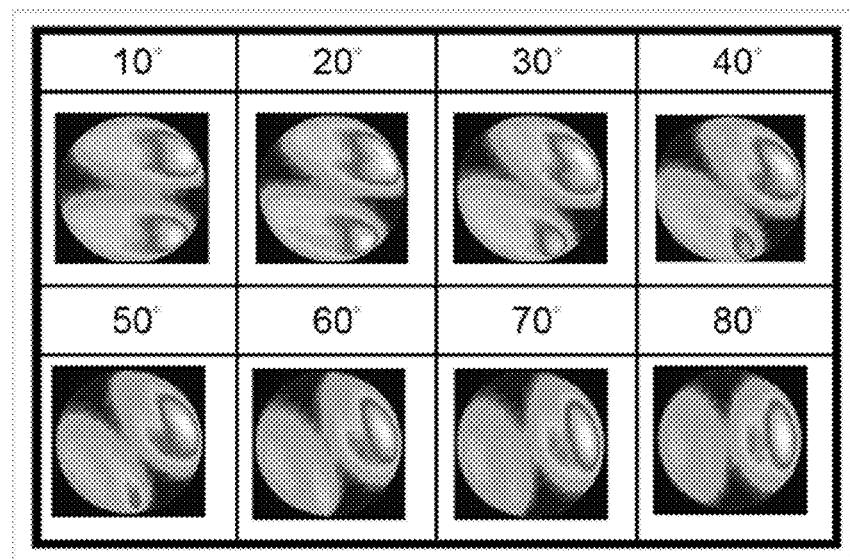
FIG. 9 is simulated view angle diagrams by changing an angle included between a ridge and an axis in accordance with another embodiment of the present invention.

Referring to FIG. 7 to FIG. 9, FIG. 9 is simulated view angle diagrams by changing an angle included between a ridge and an axis in accordance with another embodiment of the present invention. During simulation, the prism sheet 160 can be rotated in a clockwise or an counter-clockwise direction to form the angle φ between the ridge 164c of the prism structures 164 and the axis A1. FIG. 9 shows variations of view angles when the angle φ is at 10 degrees, 20 degrees, 30 degrees, 40 degrees, 50 degrees, 60 degrees, 70 degrees and 80 degrees respectively. It can be known from FIG. 9 that, it is helpful to modulate a ratio of view angles when the angle φ is adjusted to be within 20 degrees. Therefore, by changing the direction of the ridge 164c of the prism structures 164, the prism sheet meeting requirements of various view angles can be fabricated.

Figure 10:
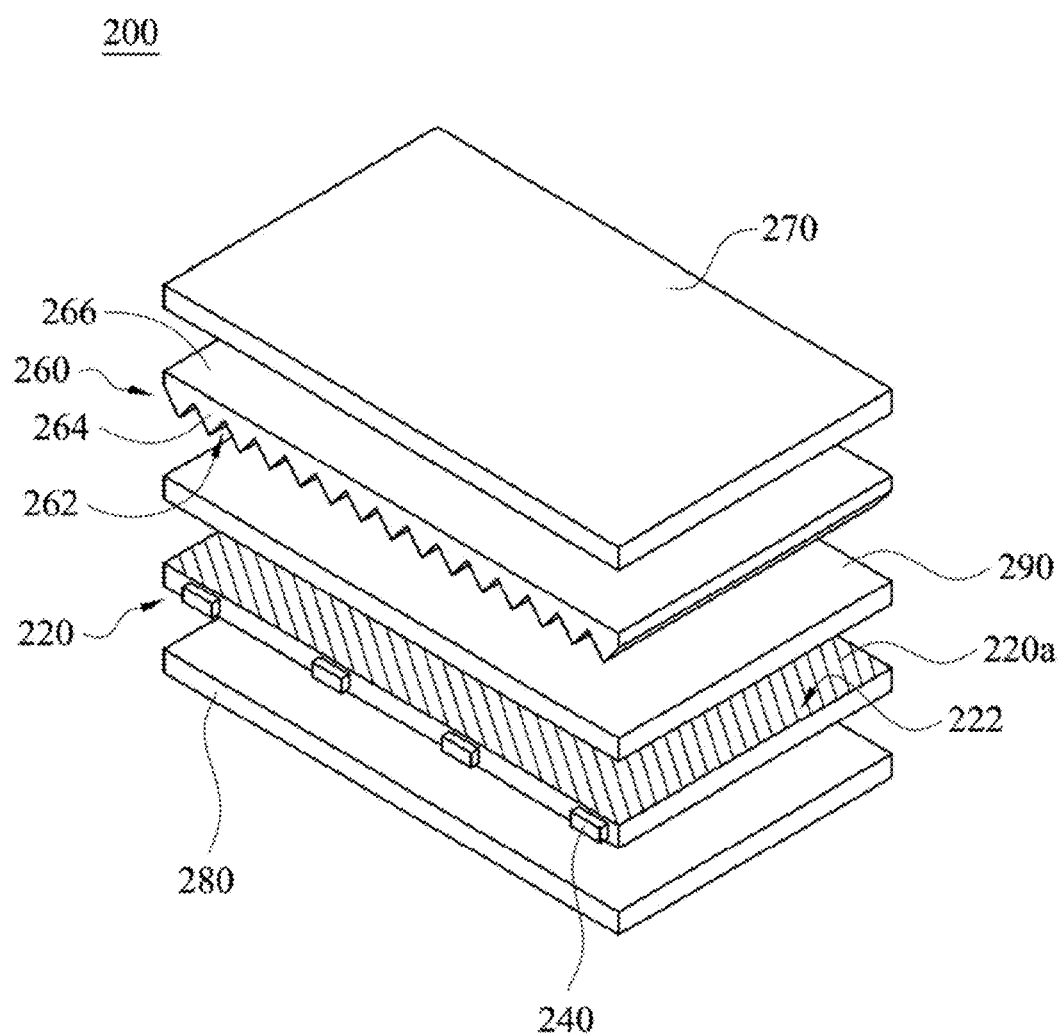
FIG. 10 is a schematic structural diagram showing a backlight module in accordance with another embodiment of the present invention.

Referring to FIG. 10, FIG. 10 is a schematic structural diagram showing a backlight module 200 in accordance with another embodiment of the present invention. The backlight module 200 includes a light guide plate 220, a light source 240, a prism sheet 260 and a reflecting sheet 280. Similarly, the light-emitting angles of light entering the light guide plate 220 can be changed by disposing the prism sheet 260 with prism structures 264, so as to achieve the same purposes of the aforementioned embodiments, and thus are not described again herein. In the present embodiment, there is an optical film 270 disposed on the prism sheet 260, and there is another optical film 290 disposed between the prism sheet 260 and the light guide plate 220. The optical film 270 and the optical film 290 are optical films with matte surfaces or polarizing plates which may compensate view angles or increase luminance.

In one embodiment, as shown in FIG. 10, the prism sheet 260 has an optical surface 262 and an optical surface 266 opposite to each other. The optical surface 262 is implemented with the prism structures 264 facing a light-emitting surface 222 of the light guide plate 220. The optical surface 266 may be implemented with the same prism structures, V-shaped structures, arc shape structures, dotted structures, or other microstructures, so as to adjust the light intensities at the view angles. In one embodiment, the light-emitting surface 222 of the light guide plate 220 may be implemented with V-shaped structures 220a for collocating with the prism structures 264 of the prism sheet 260 to adjust the light-emitting angle.

According to the aforementioned embodiments of the present invention, the present invention may change light-emitting angles of the light passing through a light guide plate by using a prism sheet with prism structures. Meanwhile, each of the prism structures has a ridge vertical to a light-emitting surface of a light source, thereby achieving a purpose of emitting light at non-orthogonal view angles. In addition, the light emitting intensity may be adjusted by altering first and second angles included between the prism structures and an optical surface so as to meet various requirements. Moreover, a ratio of view angles can be modulated by changing the arrangement direction of the prism structures to from an angle included between the ridge and the light-emitting surface of the light source, in which the angle may be smaller than or equal to 20 degrees, thereby adjusting the ratio of view angles with which the light is emitted, thus generating different directions of view angles.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a light guide plate, comprising:
      a light-emitting surface;
      a light-incident surface connected to the light-emitting surface; and
      an axis normal to the light-incident surface;
   a light source emitting light towards the light-incident surface, wherein the light source has a plurality of light-emitting elements arranged in a line parallel to the light-incident surface; and
   a prism sheet disposed on the light guide plate, the prism sheet comprising:
      a first optical surface facing the light-emitting surface; and
      a plurality of prism structures disposed on the first optical surface, wherein each of the prism structures has a first surface and a second surface, and the first surface and the second surface are connected to form a ridge, wherein the ridge is arranged in a clockwise direction or a counter-clockwise direction from the axis which is normal to the line where the light-emitting elements are arranged to define an angle included between the ridge and the axis is smaller than or equal to 20 degrees.

2. The backlight module of claim 1, wherein a first angle is included between the first optical surface and the first surface of each of the prism structures, and a second angle is included between the first optical surface and the second surface of each of the prism structures, wherein the first angle and the second angle are equal.

3. The backlight module of claim 2, wherein the first angle and the second angle of each of the prism structures are 45 degrees.

4. The backlight module of claim 1, wherein a first angle is included between the first optical surface and the first surface of each of the prism structures, and a second angle is included between the first optical surface and the second surface of each of the prism structures, wherein the first angle and the second angle are unequal.

5. The backlight module of claim 4, wherein the first angle of each of the prism structures is 45 degrees, and the second angle of each of the prism structures is in a range from 40 degrees to 45 degrees.

6. The backlight module of claim 1, wherein the prism sheet further comprises a second optical surface opposite to the first optical surface, and a plurality of microstructures are disposed on the second optical surface.

7. The backlight module of claim 6, wherein the microstructures disposed on the second optical surface of the prism sheet are prism structures, V-shaped structures, arc shape structures or dotted structures.

8. The backlight module of claim 1, wherein a plurality of microstructures are disposed on the light-emitting surface.

9. The backlight module of claim 8, wherein the microstructures disposed on the light-emitting surface of the light guide plate are prism structures, V-shaped structures, arc shape structures or dotted structures.

10. The backlight module of claim 1, further comprising two optical films respectively disposed on the prism sheet and between the light guide plate and the prism sheet.

11. A liquid crystal display, comprising:
   a backlight module as claimed in claim 1;
   a liquid crystal panel disposed on the backlight module.

12. The backlight module of claim 1, wherein all of the plurality of prism structures are arranged obliquely in relation to the axis which is normal to the line where the light-emitting elements are arranged, and are arranged parallelly such that the angles of all ridges are the same.

13. The backlight module of claim 1, wherein each of the prism structures is a continuous elongated strip which is arranged obliquely in relation to the axis which is normal to the line where the light-emitting elements are arranged, and is extended from one side of the first optical surface to another side of the first optical surface.

14. A backlight module, comprising:
   a stacked substrate unit;
   a light source emitting light towards the stacked substrate unit, wherein the light source has a plurality of light-emitting elements arranged in a line; and
   wherein the stacked substrate unit comprising a first substrate and a second substrate; and
   wherein the second substrate comprising:
      an optical surface facing the first substrate; and
      a plurality of prism structures disposed on the optical surface, wherein each of the prism structures has a first surface and a second surface, and the first surface and the second surface are connected to form a ridge, wherein the ridge is arranged in a clockwise direction or a counter-clockwise direction from an axis which is normal to the line where the light-emitting elements are arranged to define an angle included between the ridge and the axis is smaller than or equal to 20 degrees.

15. The backlight module of claim 14, wherein all of the plurality of prism structures are arranged obliquely in relation to the axis which is normal to the line where the light-emitting elements are arranged, and are arranged parallelly such that the angles of all ridges are the same.

16. The backlight module of claim 14, wherein each of the prism structures is a continuous elongated strip which is arranged obliquely in relation to the axis which is normal to the line where the light-emitting elements are arranged, and is extended from one side of the first substrate to another side of the first substrate.

17. A liquid crystal display, comprising:
   a backlight module as claimed in claim 14; and
   a liquid crystal panel disposed on the backlight module.

* * * * *